United States Patent
Tillman et al.

(10) Patent No.: US 7,435,283 B2
(45) Date of Patent: Oct. 14, 2008

(54) MODULAR FUEL STABILIZATION SYSTEM

(75) Inventors: Thomas Gregory Tillman, West Hartford, CT (US); Alexander G. Chen, Ellington, CT (US); Catalin G. Fotache, West Hartford, CT (US); Louis J. Spadaccini, Manchester, CT (US); Foster Lamm, South Windsor, CT (US); Zidu Ma, Ellington, CT (US); Lou Chiappetta, South Windsor, CT (US); Charles C. Coffin, Vernon, CT (US); James A. Wilkinson, North Brookfield, MA (US); Brian Welch, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 548 days.

(21) Appl. No.: 11/131,872

(22) Filed: May 18, 2005

(65) Prior Publication Data

US 2006/0263277 A1 Nov. 23, 2006

(51) Int. Cl.
*B01D 19/00* (2006.01)
*B01D 53/22* (2006.01)
(52) U.S. Cl. .................... 95/46; 95/54; 96/6; 96/7; 96/8; 96/9; 96/11
(58) Field of Classification Search .............. 96/4, 96/6, 7, 8, 9, 11, 218; 95/45, 46, 54, 251; 210/640, 188
See application file for complete search history.

(56) References Cited

U.S. PATENT DOCUMENTS

| | | | |
|---|---|---|---|
| 4,371,385 A | 2/1983 | Johnson | |
| 4,516,984 A | 5/1985 | Warner et al. | |
| 4,602,923 A | 7/1986 | Bernstein | |
| 4,729,773 A | 3/1988 | Shirato et al. | |
| 4,906,256 A * | 3/1990 | Baker et al. | ............. 96/9 |
| 4,955,992 A | 9/1990 | Goodale et al. | |
| 5,053,060 A | 10/1991 | Kopf-Sill et al. | |
| 5,078,755 A | 1/1992 | Tozawa et al. | |
| 5,123,937 A | 6/1992 | Shibata et al. | |
| 5,154,832 A | 10/1992 | Yamamura et al. | |
| 5,340,384 A | 8/1994 | Sims | |

(Continued)

FOREIGN PATENT DOCUMENTS

EP 0273267 7/1988

(Continued)

OTHER PUBLICATIONS

Extended European Search Report dated May 14, 2008.

*Primary Examiner*—Jason M Greene
(74) *Attorney, Agent, or Firm*—Carlson, Gaskey & Olds

(57) ABSTRACT

A fuel stabilization system includes a first deoxygenator and a second deoxygenator both for removing dissolved oxygen from a hydrocarbon fuel. The first and second deoxygenators are arranged in parallel or series to sequentially remove a portion of dissolved oxygen from the hydrocarbon fuel. The arrangement of several deoxygenators for a single fuel stream improves removal of dissolved oxygen and provides for scalability of the fuel system to meet application specific demands. The arrangement also provides for the preservation of partial system functionality in the event of the failure of one of the deoxygenator modules.

20 Claims, 2 Drawing Sheets

U.S. PATENT DOCUMENTS

| | | | |
|---|---|---|---|
| 5,410,052 A | 4/1995 | Smith et al. | |
| 5,482,860 A | 1/1996 | Copeland et al. | |
| 5,522,917 A * | 6/1996 | Honda et al. | 95/46 |
| 5,584,914 A * | 12/1996 | Senoo et al. | 96/6 |
| 5,693,122 A | 12/1997 | Berndt | |
| 5,695,545 A | 12/1997 | Cho et al. | |
| 5,888,275 A | 3/1999 | Hamasaki et al. | |
| 5,902,382 A | 5/1999 | Campain et al. | |
| 5,902,747 A | 5/1999 | Nemser et al. | |
| 6,106,591 A | 8/2000 | Keskar et al. | |
| 6,168,648 B1 | 1/2001 | Ootani et al. | |
| 6,258,154 B1 | 7/2001 | Berndt et al. | |
| 6,309,444 B1 | 10/2001 | Sims et al. | |
| 6,315,815 B1 * | 11/2001 | Spadaccini et al. | 95/46 |
| 6,379,796 B1 | 4/2002 | Uenishi et al. | |
| 6,402,810 B1 | 6/2002 | Mayer et al. | |
| 6,402,818 B1 | 6/2002 | Sengupta | |
| 6,494,938 B2 | 12/2002 | Sims et al. | |
| 6,616,841 B2 | 9/2003 | Cho et al. | |
| 6,623,637 B1 | 9/2003 | Monzen et al. | |
| 6,682,016 B1 | 1/2004 | Peroulakis | |
| 6,709,432 B2 | 3/2004 | Ferek-Patric | |
| 6,860,922 B2 * | 3/2005 | Watari et al. | 96/6 |
| 6,986,802 B2 * | 1/2006 | Colling et al. | 95/46 |
| 7,014,679 B2 * | 3/2006 | Parekh et al. | 95/46 |
| 7,144,442 B2 * | 12/2006 | Hayashi | 95/8 |
| 7,153,343 B2 * | 12/2006 | Burlatsky et al. | 95/46 |
| 2001/0035093 A1 | 11/2001 | Yokota | |
| 2002/0195385 A1 | 12/2002 | Cho et al. | |
| 2003/0116015 A1 | 6/2003 | Sengupta et al. | |
| 2003/0148164 A1 | 8/2003 | Koch et al. | |
| 2003/0151156 A1 | 8/2003 | Crumm et al. | |
| 2003/0161785 A1 | 8/2003 | Dieckmann | |
| 2003/0219637 A1 | 11/2003 | Coors | |
| 2004/0025696 A1 | 2/2004 | Varrrin, Jr. et al. | |
| 2004/0028988 A1 | 2/2004 | Bunker | |
| 2004/0050786 A1 | 3/2004 | Dey et al. | |
| 2004/0094463 A1 | 5/2004 | Laverdiere et al. | |

FOREIGN PATENT DOCUMENTS

| | | |
|---|---|---|
| EP | 0354797 | 2/1990 |
| EP | 0460512 | 12/1991 |
| EP | 0493869 | 7/1992 |
| EP | 0552090 | 7/1993 |
| EP | 0576677 | 1/1994 |
| EP | 0583748 | 2/1994 |
| EP | 0622475 | 11/1994 |
| EP | 0750322 | 12/1996 |
| EP | 0963229 | 2/1998 |
| EP | 0970738 | 1/2000 |
| EP | 1018353 | 7/2000 |
| EP | 1052011 | 11/2000 |
| EP | 1210971 | 6/2002 |
| EP | 1239189 | 9/2002 |
| EP | 1270063 | 1/2003 |
| EP | 1277504 | 1/2003 |
| EP | 1544437 | 6/2005 |
| EP | 1566428 | 8/2005 |
| EP | 1579902 | 9/2005 |
| JP | 63151307 | 6/1988 |
| JP | 3169304 | 7/1991 |
| JP | 3193106 | 8/1991 |
| JP | 5084474 | 4/1993 |
| JP | 5317605 | 12/1993 |
| JP | 7080205 | 3/1995 |
| JP | 7227504 | 8/1995 |
| JP | 8000906 | 1/1996 |
| JP | 8332306 | 12/1996 |
| JP | 10174803 | 6/1998 |
| JP | 10216404 | 8/1998 |
| JP | 11009902 | 1/1999 |
| JP | 11033373 | 2/1999 |
| JP | 11244607 | 9/1999 |
| JP | 2000051606 | 2/2000 |
| JP | 2000084368 | 3/2000 |
| JP | 20000140505 | 5/2000 |
| JP | 20000262871 | 9/2000 |
| JP | 2000288366 | 10/2000 |
| JP | 2000350902 | 12/2000 |
| JP | 2003010604 | 1/2003 |
| JP | 2003062403 | 3/2003 |
| JP | 2003200024 | 7/2003 |
| JP | 2003245525 | 9/2003 |
| WO | WO 94/16800 | 8/1994 |
| WO | WO 97/02190 | 1/1997 |
| WO | WO 98/34709 | 8/1998 |
| WO | WO 99/39811 | 8/1999 |
| WO | WO 00/44479 | 8/2000 |
| WO | WO 00/44482 | 8/2000 |
| WO | WO 02/062446 | 8/2002 |
| WO | WO 03/029744 | 4/2003 |
| WO | WO 03/036747 | 5/2003 |
| WO | WO 03/080228 | 10/2003 |
| WO | WO 03/086573 | 10/2003 |
| WO | WO 2004/007060 | 1/2004 |
| WO | WO 2004/041397 | 5/2004 |

* cited by examiner

MODULAR FUEL STABILIZATION SYSTEM

BACKGROUND OF THE INVENTION

This invention generally relates to a fuel stabilization system for an energy conversion device, and more particularly to a fuel stabilization system including several fuel deoxygenators for removing dissolved oxygen from a fuel.

Hydrocarbon fuels typically include some amount of dissolved oxygen due to exposure to air during transport or storage. Dissolved oxygen within the fuel limits the temperature to which the fuel may be heated due to the formation of insoluble products referred to as "coke". The formation of coke deposits is dependent on the amount of dissolved oxygen present within the fuel. Reducing the amount of dissolved oxygen within the fuel decreases the rate of coke deposition and increases the maximum sustainable temperature of the fuel.

U.S. Pat. Nos. 6,315,815, and 6,709,432 assigned to Applicant, discloses devices for removing dissolved oxygen using a selective gas-permeable membrane disposed within the fuel system. As fuel passes along the permeable membrane, oxygen molecules in the fuel diffuse out of the fuel across the gas-permeable membrane. An oxygen partial pressure differential across the permeable membrane drives oxygen from the fuel, which is unaffected and passes over the membrane.

The more dissolved oxygen that can be removed from the fuel, the greater the fuel temperature before coke deposits form, thereby increasing the practical temperatures to which fuel can be heated prior for combustion to improve operating efficiencies. Disadvantageously, the size of a fuel deoxygenator increases proportionably with the requirements for removing oxygen. An increase in oxygen removal from 90% to 99% may require nearly a doubling of deoxygenator size. Further, as operational requirements change, so may the required oxygen removal rate. A single fuel deoxygenator may not adjust readily or be scalable to accommodate variations in oxygen removal requirements.

Accordingly, it is desirable to develop a fuel stabilization system that removes dissolved oxygen to allow increased fuel temperatures, and that is scaleable to accommodate changing oxygen removal requirements.

SUMMARY OF THE INVENTION

An example fuel stabilization system according to this invention includes several fuel deoxygenators operating in concert to remove dissolved oxygen from a hydrocarbon fuel.

An example fuel stabilization system according to this invention includes a plurality of fuel deoxygenating devices that are arranged in parallel. Hydrocarbon fuel flows in substantially equal portions through each of the plurality of fuel deoxygenating devices. Each of the fuel deoxygenating devices removes a portion of dissolved oxygen from the hydrocarbon fuel, which then exits the fuel stabilization system with a substantially increased temperature capacity.

Another example fuel stabilization system according to this invention includes a plurality of fuel deoxygenators arranged in series. Each of the fuel deoxygenators removes progressively additional amounts of dissolved oxygen. An initial fuel deoxygenator operates at a temperature well below that at which coke and other insoluble byproducts are formed. A second fuel deoxygenator operates at an elevated temperature due to the initial removal of some portion of dissolved oxygen from the fuel. Several fuel deoxygenators in series remove additional amounts of dissolved oxygen and can operate at increasingly elevated temperature that provide increased oxygen removal efficiencies.

The modular approach to using a plurality of fuel deoxygenating devices instead of merely using one deoxygenating device provides many advantages. Those advantages include the ability to troubleshoot and replace a specific deoxygenator that may not be operating as desired. Further, the use of fuel deoxygenating devices in series or parallel allows for each device to be operated at different temperatures and thereby provide the hydrocarbon fuel with different usable cooling capacities that can be tailored to specific systems requirements. Finally, spreading the deoxygenation function among several independent fuel stabilization modules may also provide an advantage relative to overall system reliability and functionality, as the failure of one unit would not represent a complete loss of deoxygenation functionality but rather would only impact a portion of the overall system capability.

Accordingly, the fuel stabilization system according to this invention increases and optimizes the efficiency of dissolved oxygen removal from a fuel providing significant system benefits.

These and other features of the present invention can be best understood from the following specification and drawings, the following of which is a brief description.

DETAILED DESCRIPTION OF THE PREFERRED EMBODIMENT

Figure 1:
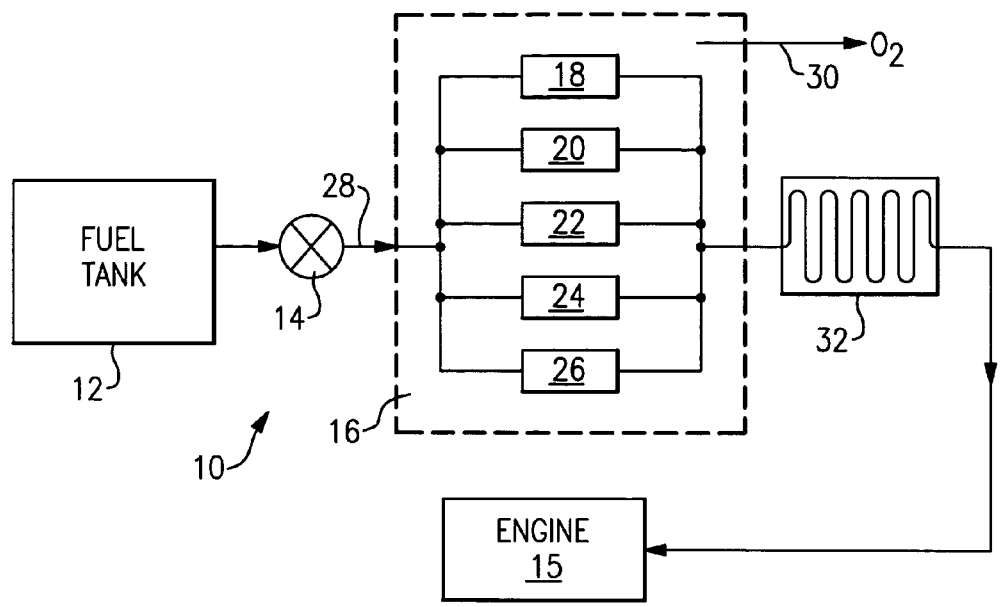
FIG. 1 is a schematic illustration of an example fuel stabilization system according to this invention.

Referring to FIG. 1, a fuel stabilization system 10 is schematically illustrated and includes a fuel tank 12 or other fuel source that provides fuel by way of a fuel pump 14 to an engine 15. A fuel stabilization assembly 16 removes dissolved oxygen from within the fuel. The fuel stabilization assembly 16 includes a plurality of deoxygenators 18,20,22, 24,26. The example fuel stabilization assembly 16 includes five deoxygenators 18, 20, 22, 24 and 26, arranged in a parallel configuration.

The parallel configuration provides a substantially uniform pressure drop across the fuel stabilization assembly 16. Each of the fuel deoxygenators 18, 20, 22, 24 and 26, provides an identical or very similar drop in fuel pressure. In some instances a single large deoxygenator can cause an undesirable drop in fuel pressure that is compensated for by other system devices such as the pump 14. However, the use of the plurality of parallel configured deoxygenators 18, 20, 22, 24 and 26 may reduce requirements for adapting to pressure drops as compared to the use of a single larger fuel deoxygenator without sacrificing the amount of dissolved oxygen removes from the fuel.

Each of the fuel deoxygenators 18, 20, 22, 24 and 26, removes a portion of dissolved oxygen from the fuel and exhausts the removed oxygen overboard as is indicated at 30. The temperature of incoming fuel is within desirable limits that do not encourage the generation of insoluble materials in the presence of dissolved oxygen. Fuel leaving the fuel stabilization assembly 16 includes a reduced amount of dissolved oxygen and therefore can be heated to increased temperatures. A heat transfer device 32 provides for the transfer and heating of the fuel. The heat transfer device 32 may be of any configuration known to a worker skilled in the art. Increased temperature capability of the fuel provides for increased engine efficiencies. The increased temperature capacity of the fuel can thereby be utilized as a heat sink to absorb heat from other systems. Further, increasing the temperature of the fuel can improve combustion by speeding vaporization of the fuel.

Figure 2:
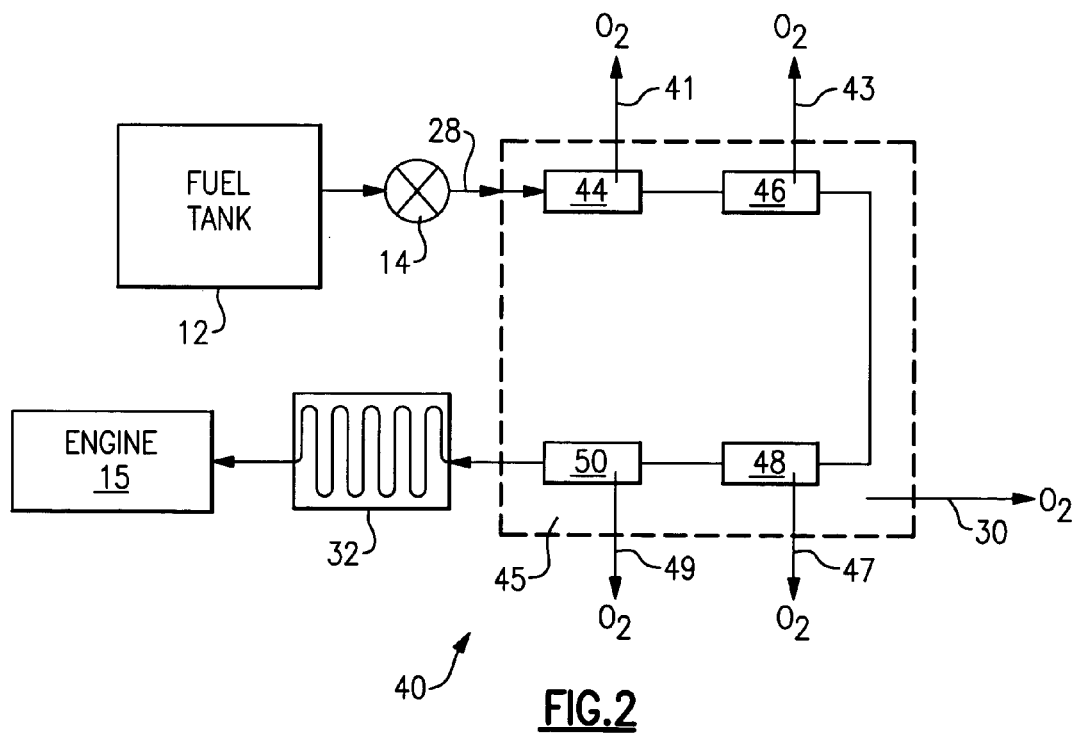
FIG. 2 is a schematic illustration of another example fuel stabilization system according to this invention.

Referring to FIG. 2 another example fuel stabilization system according to this invention is generally indicated at 40 and includes a fuel stabilization assembly 45 having a plurality of deoxygenating devices 44, 46, 48, 50, arranged in series. The series arrangement provides for a sequential and proportional removal of dissolved oxygen from the fuel. A first portion 41 of dissolved oxygen is removed from the hydrocarbon fuel in the first deoxygenator 44. A second portion 43 is then removed by the second deoxygenator 46, a third portion 47 removed by the third deoxygenator 48, and a forth portion 49 is removed by the fourth deoxygenator 50. The subsequent removal of additional amounts of dissolved oxygen from the hydrocarbon fuel provides for the use of deoxygenators of differing sizes and capacities along with operating each deoxygenator 44, 46, 48 and 50 at different temperatures to optimize the removal of dissolved oxygen.

A hydrocarbon fuel 28 entering the first deoxygenator 44 must be at a temperature below that temperature that may cause an undesirable formation of insoluble materials. However, subsequent deoxygenators such as the second deoxygenator 46 can operate at temperatures above that temperature at which the first deoxygenator 44 must operate due to the removal of the first portion 41 of dissolved oxygen. Accordingly, subsequently aligned fuel deoxygenators can operate at progressively greater and greater temperatures due to the ever decreasing amount of dissolved oxygen contained within the hydrocarbon fuel removed by a previous deoxygenator.

Hydrocarbon fuel exiting the fuel stabilization assembly 45 is then introduced into the heat transfer device 32. As appreciated, the heat transfer device 32 can be of any configuration known to a worker skilled in this art. Further, the heat transfer device 32 may transfer heat from another system requiring cooling to utilize the increased cooling capacity of the hydrocarbon fuel. Additionally, the heat transfer device 32 may heat the fuel to a level to aid vaporization and thereby combustion of the hydrocarbon fuel once it reaches the combustion device disposed within the engine 15.

Figure 3:
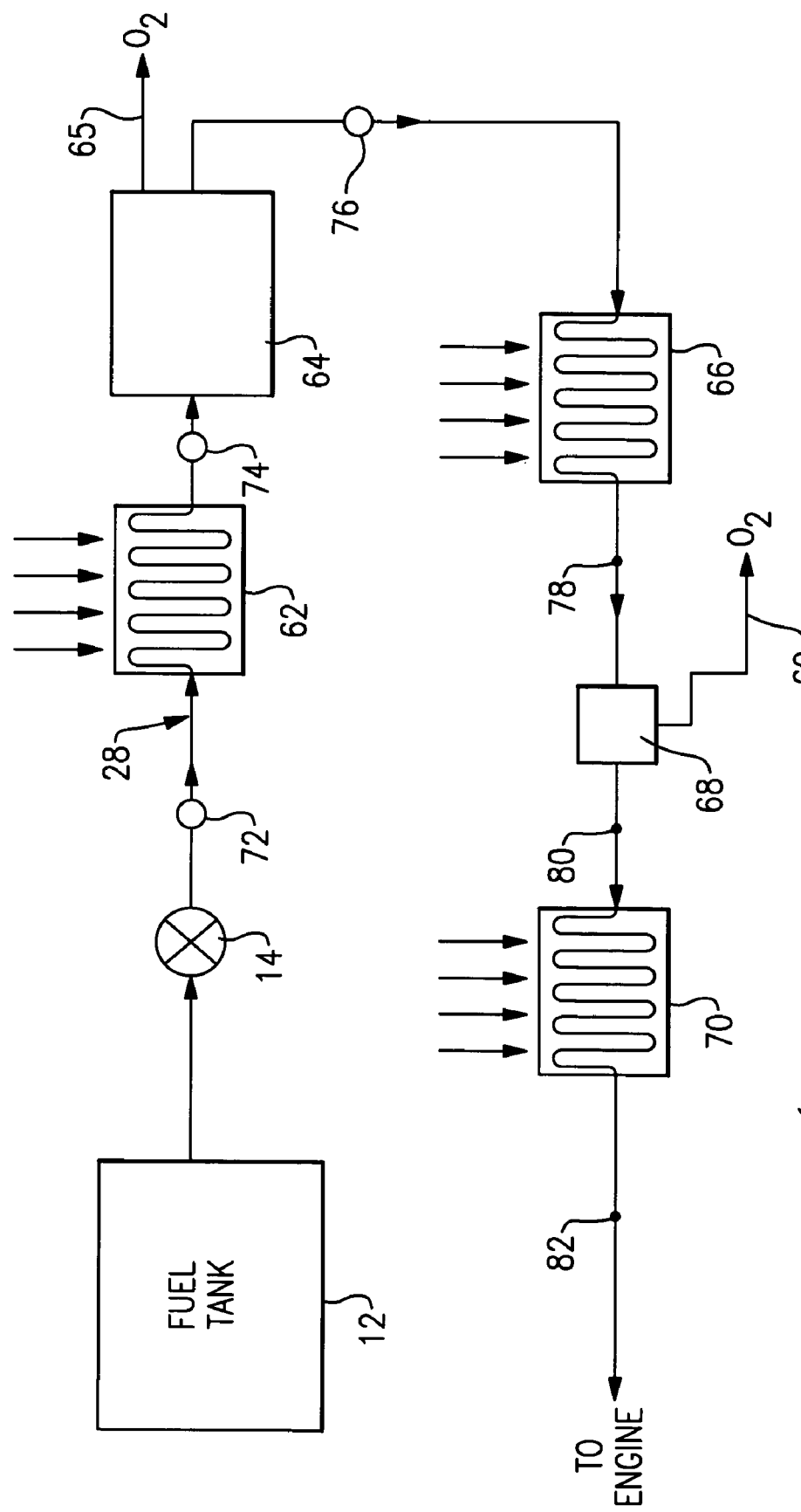
FIG. 3 is a schematic illustration of yet another example fuel stabilization system according to this invention.

Referring to FIG. 3, another example fuel stabilization system 60 includes a first deoxygenator 64 and a second deoxygenator 68. The first deoxygenator 64 operates to remove a first portion of dissolved oxygen 65 from the hydrocarbon fuel 28. The modular approach of configuring the first deoxygenator 64 and the second deoxygenator 68 provides for the utilization of different size deoxygenators. Varying the size and performance of cascaded deoxygenators between a low temperature operational device and a high temperature device provides packaging and operational benefits. Increasing the fuel temperature entering a deoxygenator increases its performance due to enhanced oxygen diffusivity and solubility at higher temperature.

The modular approach of this invention can capture the benefit of fuel heating optimally, since for a single deoxygenator the inlet temperature is for example limited to a range of between 250° F. and 325° F. Accordingly, the modular configuration of the fuel stabilization system 60 provides that each successive deoxygenator may have an ever increasing inlet temperature due to the level of deoxygenation that is being accomplished at the previous deoxygenator.

In FIG. 3 the fuel 28 leaves the pump 14 at a first temperature 72. Once the fuel 28 exits the first heat transfer device 62, it is at a temperature 74. The temperature 74 must be within a limited temperature range that does not cause the formation of an unmanageable amount of insoluble materials due to coking. At this point, the temperature 74 must be maintained within a level that accommodates the increased level of oxygen within the hydrocarbon fuel. After the fuel has flowed through the first deoxygenator 64 and the first portion of oxygen 65 has been removed, the temperature can be raised to a temperature indicated at 76 that is higher that the temperature 74.

The hydrocarbon fuel 28 temperature can then further be raised within a second heat transfer device 66 to a fourth temperature 78 that is higher than the fuel temperature of the fuel 28 that first entered the first deoxygenator 64. The second deoxygenator 68 removes a second portion of oxygen 69 and operates at a higher temperature than the first deoxygenator 64 because of the decreased amount of dissolved oxygen that had been previously removed by the first deoxygenator 64. The fuel exiting the second deoxygenator 68 is at a temperature 80 that can again be further elevated in temperature to a final temperature 82.

The hydrocarbon fuel temperature is elevated from the temperature 80 to the temperature 82 by a third heat transfer device 70. Although, two deoxygenators 64, 68 are shown in series, additional fuel deoxygenators and heat transfer devices can be arranged to optimally and successively provide for increased fuel temperatures of the hydrocarbon fuel due to the successive decrease in dissolved oxygen within that hydrocarbon fuel.

The example fuel stabilization systems of this invention provide deoxygenation of hydrocarbon fuel using a variety of configurations including series and parallel orientations of a plurality of fuel deoxygenators to lower the dissolved oxygen content within a hydrocarbon fuel. The lowering of dissolved oxygen within the hydrocarbon fuel enables fuel temperatures to reach as high as between 800° F. and 900° F. This increases the heat sink capacity of the fuel, which in turn can provide improved system and engine efficiencies.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel stabilization system comprising:
   a first fuel deoxygenator for removing a first portion of oxygen from a fuel at a first temperature lower than a temperature that produces undesirable by-products responsive to an amount of dissolved oxygen within the fuel prior to entering the first fuel deoxygenator; and
   a second fuel deoxygenator for removing a second portion of oxygen from the fuel at a second temperature greater than the first temperature, wherein said first fuel deoxygenator and said second deoxygenator remove oxygen from a common fuel stream.

2. The system as recited in claim 1, wherein said second fuel deoxygenator comprises a plurality of fuel deoxygenators.

3. The system as recited in claim 1, wherein said first fuel deoxygenator and said second deoxygenator are arranged in series.

4. The system as recited in claim 1, wherein said first deoxygenator and said second deoxygenator are arranged in parallel.

5. The system as recited in claim 1, wherein said first portion of oxygen removed from the fuel by the first deoxygenator is greater than said second portion of oxygen removed by said second fuel deoxygenator.

6. The system as recited in claim 1, wherein said first deoxygenator has a greater capacity for removing dissolved oxygen from the fuel than said second fuel deoxygenator.

7. The system as recited in claim 1, including a heat transfer device for transferring heat into the fuel, wherein said heat transfer device is disposed downstream of at least one of said first deoxygenator and said second deoxygenator.

8. The system as recited in claim 1, including a first heat transfer device for transferring heat to the fuel before entering said first fuel deoxygenator.

9. The system as recited in claim 8, including a second heat transfer device for transferring heat to the fuel after exiting said first deoxygenator.

10. The system as recited in claim 9, including a third heat transfer device for transferring heat to the fuel after exiting said second heat transfer device.

11. A method of stabilizing a fuel for a fuel delivery system comprising the steps of:
    a) flowing a fuel at a first temperature through a first deoxygenator and removing a first portion of dissolved oxygen;
    b) flowing the hydrocarbon fuel through a second deoxygenator and removing a second portion of dissolved oxygen; and
    c) increasing a temperature of the fuel to a second temperature greater than said first temperature after the fuel exits the first deoxygenator and prior to entering the second deoxygenator.

12. The method as recited in claim 11, wherein the first temperature is below a temperature that produces undesirable by-products responsive to an amount of dissolved oxygen with the fuel prior to entering the first deoxygenator.

13. A method of stabilizing a fuel for a fuel delivery system comprising the steps of:
    a) flowing a fuel at a first temperature through a first deoxygenator and removing a first portion of dissolved oxygen, wherein the first temperature is below a temperature that produces undesirable by-products responsive to an amount of dissolved oxygen with the fuel prior to entering the first deoxygenator;
    b) flowing the hydrocarbon fuel through a second deoxygenator and removing a second portion of dissolved oxygen; and
    c) increasing a temperature of the fuel to a second temperature greater than said first temperature after the fuel exits the first deoxygenator and prior to entering the second deoxygenator.

14. The method as recited in claim 13, wherein said second temperature is greater than a temperature that causes formation of insoluble materials in fuel including said first portion of dissolved oxygen, such that said second temperature is only obtainable without producing insoluble materials after removing the first portion of dissolved oxygen from the fuel.

15. The method as recited in claim 11, wherein said first deoxygenator and said second deoxygenator are arranged in series.

16. The method as recited in claim 11, wherein said first deoxygenator and said second deoxygenator are arranged in parallel.

17. The method as recited in claim 11, wherein said first portion of dissolved oxygen removed by said first deoxygenator is less than said second portion removed by said second deoxygenator.

18. The method as recited in claim 11, including the step of flowing the fuel through a heat transfer device to transfer heat into the fuel.

19. The system as recited in claim 1, including a heat exchanger receiving fuel exiting the first fuel deoxygenator and communicating fuel to the second fuel deoxygenator, for increasing fuel temperature form the first temperature to the second temperature.

20. The system as recited in claim 1, wherein the second temperature is greater than a temperature that causes formation of insoluble materials in fuel including the first portion of dissolved oxygen, such that the second temperature is only obtainable without producing insoluble material after removing the first portion of dissolved oxygen from the fuel.

* * * * *